(12) United States Patent
Diel et al.

(10) Patent No.: US 10,430,121 B2
(45) Date of Patent: Oct. 1, 2019

(54) EFFICIENT ASYNCHRONOUS MIRROR COPY OF FULLY PROVISIONED VOLUMES TO THIN-PROVISIONED VOLUMES

(71) Applicant: International Business Machines Corporation, Armonk, NY (US)

(72) Inventors: Eduard A. Diel, Tucson, AZ (US); Lisa J. Gundy, Tucson, AZ (US); David M. Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 15/243,071

(22) Filed: Aug. 22, 2016

(65) Prior Publication Data

US 2018/0052621 A1    Feb. 22, 2018

(51) Int. Cl.
  *G06F 3/06* (2006.01)
(52) U.S. Cl.
  CPC ............ *G06F 3/067* (2013.01); *G06F 3/0608* (2013.01); *G06F 3/0647* (2013.01)
(58) Field of Classification Search
  CPC .... G06F 3/0608; G06F 3/0619; G06F 3/0631; G06F 3/065; G06F 3/0665; G06F 3/067
  USPC .......................................... 711/162, 165, 209
  See application file for complete search history.

(56) References Cited

U.S. PATENT DOCUMENTS

| | | |
|---|---|---|
| 6,269,431 B1 | 7/2001 | Dunham |
| 6,351,792 B1 | 2/2002 | Milillo |
| 6,353,878 B1 | 3/2002 | Dunham |
| 6,366,987 B1 | 4/2002 | Tzelnic et al. |
| 6,385,706 B1 | 5/2002 | Ofek et al. |
| 6,434,681 B1 | 8/2002 | Armangau |
| 6,446,175 B1 | 9/2002 | West et al. |
| 6,457,109 B1 | 9/2002 | Milillo et al. |
| 6,549,992 B1 | 4/2003 | Armangau et al. |
| 8,453,011 B2 | 5/2013 | Kawaguchi et al. |
| 8,527,723 B1 | 9/2013 | Kasako |
| 8,762,663 B2 | 6/2014 | Broido et al. |

(Continued)

OTHER PUBLICATIONS

List of IBM Patents or Patent Applications Treated as Related.
(Continued)

*Primary Examiner* — Gary J Portka
(74) *Attorney, Agent, or Firm* — Nelson and Nelson; Daniel P. Nelson; Alexis V. Nelson

(57) ABSTRACT

A method for copying data from a primary fully provisioned volume to a secondary thin-provisioned volume is disclosed. In one embodiment, such a method includes hosting, on a primary storage system, a fully provisioned volume comprising a plurality of storage elements. A volume table of contents (VTOC) associated with the fully provisioned volume is analyzed to determine which storage elements in the fully provisioned volume have been allocated to data sets. In certain embodiments, the VTOC is copied into memory of a secondary host system and the secondary host system analyzes the copy to determine which storage elements in the fully provisioned volume have been allocated to data sets. The method then copies, from the fully provisioned volume to a secondary thin-provisioned volume, data in only those storage elements that have been allocated to data sets. A corresponding system and computer program product are also disclosed.

20 Claims, 6 Drawing Sheets

(56) References Cited

U.S. PATENT DOCUMENTS

| | | |
|---|---|---|
| 8,769,186 B2 | 7/2014 | Garman et al. |
| 8,775,751 B1 | 7/2014 | Pendharkar et al. |
| 8,782,358 B2 | 7/2014 | Broido et al. |
| 8,806,157 B2 | 8/2014 | Broido et al. |
| 8,892,847 B2 | 11/2014 | Imazaki et al. |
| 8,935,499 B2 * | 1/2015 | Chhaunker ............ G06F 12/00 711/161 |
| 2005/0071549 A1 | 3/2005 | Tross et al. |
| 2006/0224844 A1 * | 10/2006 | Kano .................... G06F 3/0605 711/162 |
| 2007/0277015 A1 | 11/2007 | Kalos et al. |
| 2008/0034176 A1 | 2/2008 | Akutsu et al. |
| 2009/0055593 A1 | 2/2009 | Satoyama et al. |
| 2009/0240880 A1 | 9/2009 | Kawaguchi |
| 2012/0151139 A1 | 6/2012 | Shiga |
| 2012/0210064 A1 | 8/2012 | Coronado et al. |
| 2012/0254114 A1 | 10/2012 | Gundy et al. |
| 2012/0278568 A1 | 11/2012 | Broido et al. |
| 2012/0278572 A1 | 11/2012 | Broido et al. |
| 2012/0331224 A1 | 12/2012 | Jones et al. |
| 2012/0331225 A1 | 12/2012 | Jones et al. |
| 2013/0036280 A1 | 2/2013 | Futawatari et al. |
| 2013/0282887 A1 | 10/2013 | Terayama et al. |
| 2013/0282966 A1 | 10/2013 | Venkiteswaran |
| 2013/0346712 A1 | 12/2013 | Agombar et al. |
| 2013/0346713 A1 * | 12/2013 | Beeken .................. G06F 3/065 711/162 |
| 2014/0195745 A1 | 7/2014 | Shiratori |
| 2014/0304224 A1 | 10/2014 | Lopez et al. |
| 2014/0359238 A1 | 12/2014 | Imazaki et al. |
| 2017/0300243 A1 * | 10/2017 | Diel ...................... G06F 3/0619 |

OTHER PUBLICATIONS

Qian et al., "ThinStore: Out-of-Band Virtualization with Thin Provisioning," 2011 Sixth IEEE International Conference on Networking, Architecture, and Storage, Jul. 2011.

* cited by examiner

EFFICIENT ASYNCHRONOUS MIRROR COPY OF FULLY PROVISIONED VOLUMES TO THIN-PROVISIONED VOLUMES

BACKGROUND

Field of the Invention

This invention relates to systems and methods for replicating data from fully provisioned volumes to thin-provisioned volumes.

Background of the Invention

In data replication environments such as Peer-to-Peer-Remote-Copy ("PPRC") or Extended-Remote-Copy ("XRC") environments, data is mirrored from a primary volume, residing on primary storage system, to a secondary volume residing on a secondary storage system, in order to maintain two consistent copies of the data. The primary and secondary storage systems may be located at different sites, perhaps hundreds or even thousands of miles away from one another. In the event the primary storage system fails, I/O may be redirected to the secondary storage system, thereby enabling continuous operations. When the primary storage system is repaired, I/O may resume to the primary storage system.

When setting up an asynchronous data replication system such as XRC, data residing on a primary volume may be initially copied to a secondary volume. Updates to the primary volume may then be asynchronously mirrored to the secondary volume to maintain two consistent copies of the data. Although this process works well for conventional fully provisioned volumes, problems may arise when using thin-provisioned volumes on the primary and/or secondary storage systems.

As known to those of skill in the art, a thin-provisioned volume is a volume characterized by virtual capacity and real capacity. Virtual capacity is the storage capacity that is available to hosts accessing the thin-provisioned volume. Real capacity is the storage capacity of the thin-provisioned volume that is actually backed by physical storage. As data is written to a thin-provisioned volume, physical storage space may be allocated to the thin-provisioned volume from a free storage pool on an as-need basis, thereby increasing its real capacity. Similarly, as data is deleted or erased from the thin-provisioned volume, physical storage space may be released back to the free storage pool, thereby making it available to other thin-provisioned volumes, or the same thin-provisioned volume if needed again. In this way, a thin-provisioned volume may efficiently utilize physical storage space and prevent the "overprovisioning" of physical storage space.

Unfortunately, asynchronous data replication technologies may run into problems when establishing mirroring relationships between thin-provisioned volumes, or between fully provisioned volumes and thin-provisioned volumes. As previously stated, when setting up an asynchronous data replication environment, data residing on a primary volume may be initially copied to a secondary volume. Because a thin-provisioned volume may appear to a host to have a certain virtual capacity, the entire virtual capacity of the primary thin-provisioned volume may be copied to a secondary thin-provisioned volume when establishing an asynchronous data mirroring relationship. Similarly, a fully provisioned volume may have a certain designated capacity even if all storage elements in the fully provisioned volume have not been allocated to (i.e., assigned to) data sets. This may result in the entire capacity of the fully provisioned volume being copied to a secondary thin-provisioned volume when establishing an asynchronous data mirroring relationship.

In either case, this will cause substantially more physical storage space than is necessary (i.e., equal to the virtual capacity of the primary thin-provisioned volume or the entire capacity of the fully provisioned volume) to be allocated to the secondary thin-provisioned volume. This undermines the purpose of thin-provisioning at the secondary storage system by inefficiently utilizing storage space.

In view of the foregoing, what are needed are systems and methods to more effectively utilize a thin-provisioned volume at a secondary storage system of a data replication system, particularly an asynchronous data replication system.

SUMMARY

The invention has been developed in response to the present state of the art and, in particular, in response to the problems and needs in the art that have not yet been fully solved by currently available systems and methods. Accordingly, the invention has been developed to provide systems and methods to replicate data from a primary fully provisioned volume to a secondary thin-provisioned volume. The features and advantages of the invention will become more fully apparent from the following description and appended claims, or may be learned by practice of the invention as set forth hereinafter.

Consistent with the foregoing, a method for copying data from a primary fully provisioned volume to a secondary thin-provisioned volume is disclosed. In one embodiment, such a method includes hosting, on a primary storage system, a fully provisioned volume comprising a plurality of storage elements. A volume table of contents (VTOC) associated with the fully provisioned volume is analyzed to determine which storage elements in the fully provisioned volume have been allocated to data sets. In certain embodiments, the VTOC is copied into memory of a secondary host system and the secondary host system analyzes the copy to determine which storage elements in the fully provisioned volume have been allocated to data sets. The method then copies, from the fully provisioned volume to a secondary thin-provisioned volume, data in only those storage elements that have been allocated to data sets.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
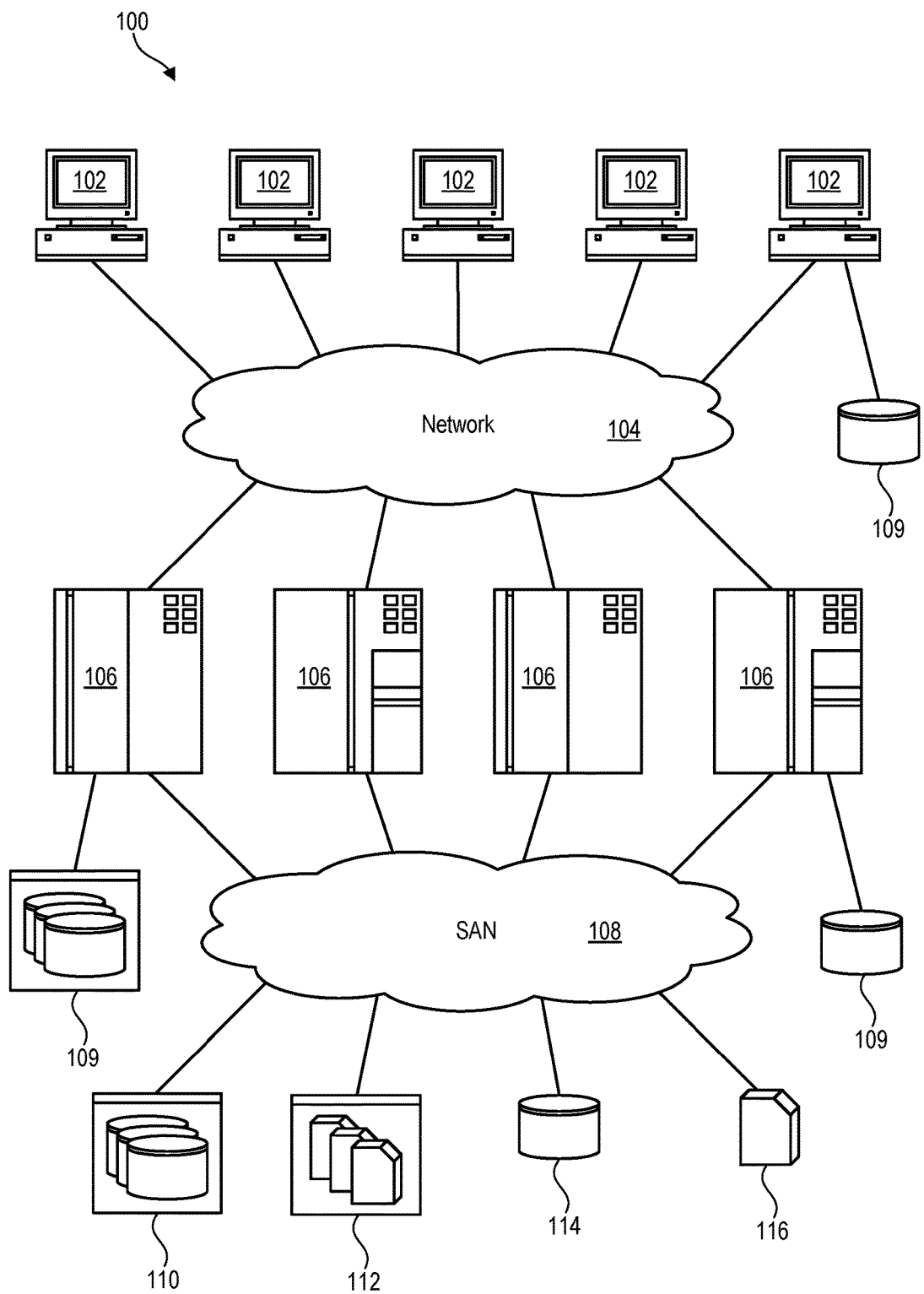
FIG. 1 is a high-level block diagram showing one example of a network environment in which systems and methods in accordance with the invention may operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented only by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays of hard-disk drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
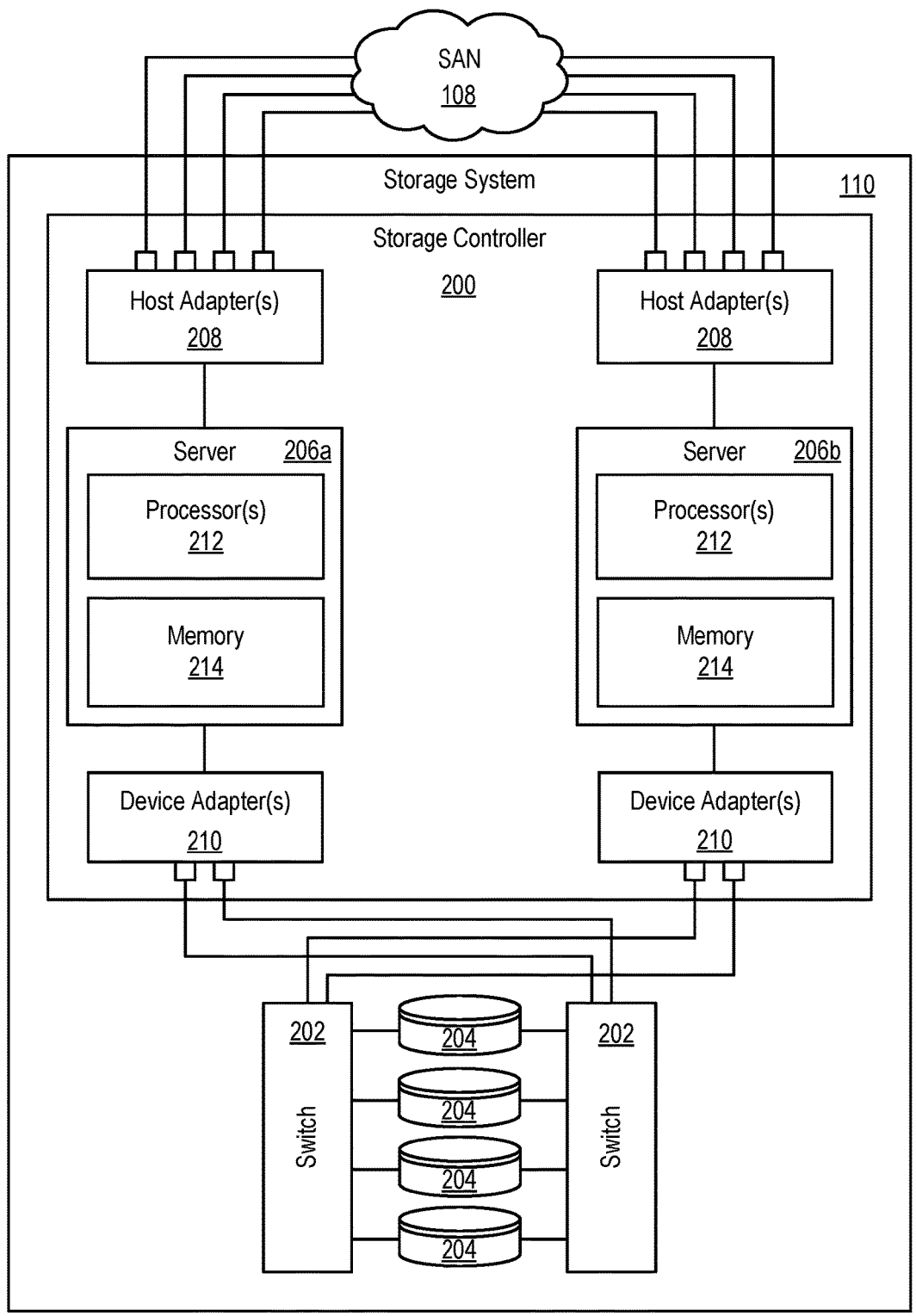
FIG. 2 is a high-level block diagram showing one example of a storage system that may be included in a data replication system.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
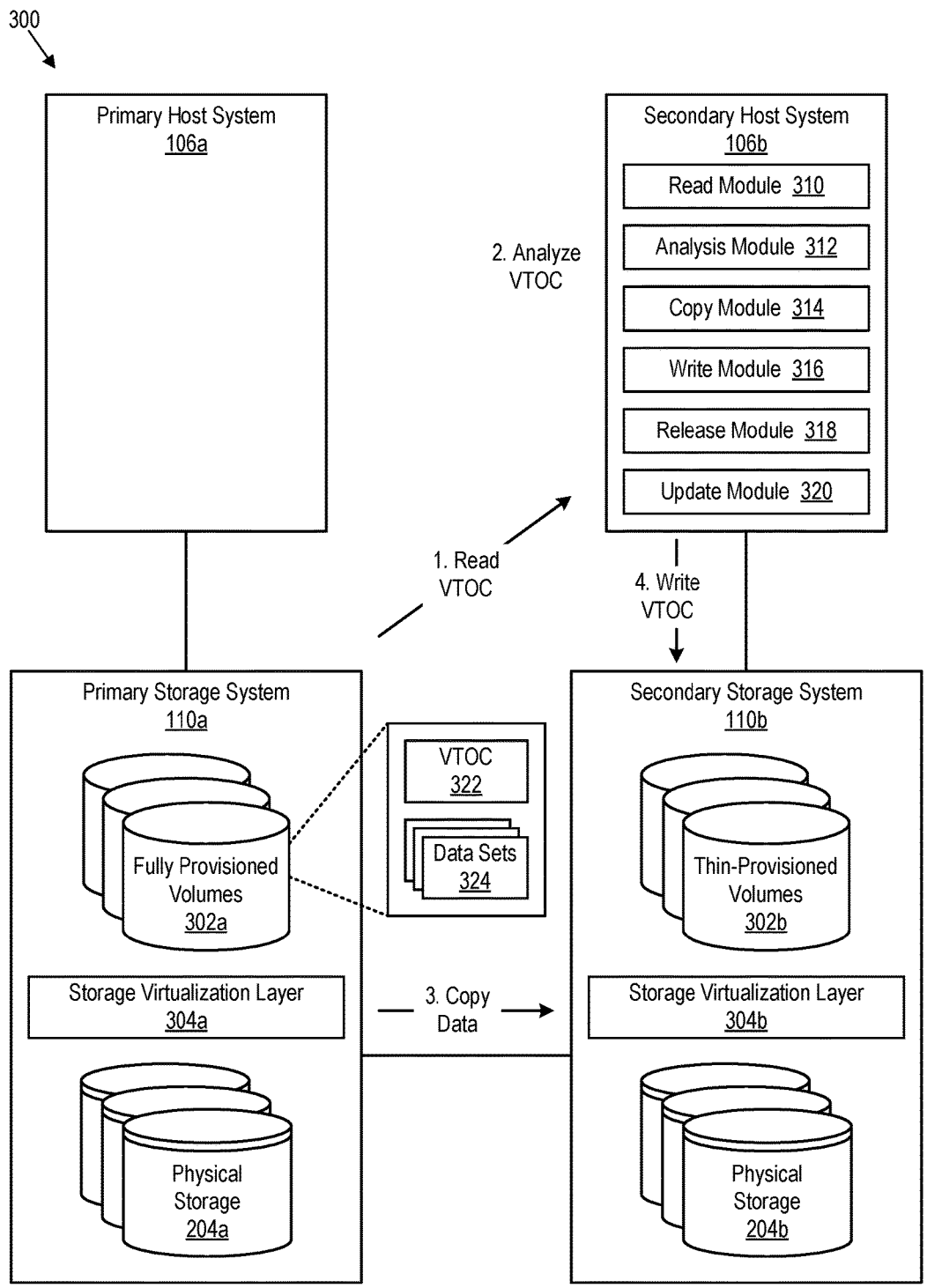
FIG. 3 is a high-level block diagram showing a data replication system and associated modules that may be configured to initially copy data from primary fully provisioned volumes to secondary thin-provisioned volumes.

Referring to FIG. 3, in certain embodiments, a storage system 110 such as that described in FIG. 2 may be included in a data replication system 300, where data is mirrored from a primary storage system 110a to a secondary storage system 110b. Such a system 300 may maintain two consistent copies of the data. The primary and secondary storage systems 110a, 110b may be located at different sites, perhaps hundreds or even thousands of miles away from one another. In the event the primary storage system 110a fails, I/O may be redirected to the secondary storage system 110b after disaster recovery operations are complete at the secondary site.

As shown in FIG. 3, the data replication system 300 may include a host system 106a at the primary site (hereinafter a "primary host system 106a") and a host system 106b at the secondary site (hereinafter a "secondary host system 106b"). If the primary host system 106a and/or primary storage system 110a fails, the secondary host system 106b may step in to perform operations of the primary host system 106a. Under normal operating conditions, the secondary host system 106b may also assist in replicating data from the primary storage system 110a to the secondary storage system 110b. For example, in an asynchronous data replication system such as XRC (also known as z/OS Global Mirror), when writes occur to the primary storage system 110a, the secondary host system 106b asynchronously reads the newly written data from the primary storage system 110a and writes it to the secondary storage system 110b, thereby maintaining two consistent copies of the data.

As previously mentioned, when setting up asynchronous data replication systems such as XRC, data residing on a primary volume 302a may be initially copied to a secondary volume 302b. Updates to the primary volume 302a may then be asynchronously mirrored to the secondary volume 302b to maintain two identical copies of the data. Although this process works well for conventional fully provisioned volumes, problems may arise when using thin-provisioned volumes 302b at the secondary site, as shown in FIG. 3.

As previously explained, a thin-provisioned volume 302b may be characterized by virtual capacity and real capacity. Virtual capacity is storage capacity that is available to hosts 106 accessing the thin-provisioned volume 302b. Real capacity is storage capacity of the thin-provisioned volume 302b that is actually backed by physical storage 204b. A storage virtualization layer 304b may map real capacity to physical storage 204. As data is written to a thin-provisioned volume 302b, the storage virtualization layer 304b will allocate physical storage space 204b to the thin-provisioned volume 302b from a free storage pool, thereby increasing its real capacity. Similarly, as data is deleted or erased from the thin-provisioned volume 302b, software can notify the storage virtualization layer 304b that it can reclaim physical storage space 204b from the thin-provisioned volume 302b and return it to the free storage pool, thereby making it available to other thin-provisioned volumes 302b or the same thin-provisioned volume 302b if needed again. In this way, a thin-provisioned volume 302b may efficiently utilize physical storage space and prevent fully provisioning physical storage space.

As previously mentioned, a fully provisioned volume 302a may have a certain designated capacity even if all storage elements in the fully provisioned volume have not been allocated to data sets 324 residing in the fully provisioned volume 302a. A conventional secondary host system 106b may copy the entire capacity of the primary fully provisioned volume 302a to the secondary thin-provisioned volume 302b when establishing an asynchronous data mirroring relationship, regardless of whether all storage elements in the primary fully provisioned volume 302a have been allocated to data sets 324. This may allocate substantially more physical storage space to the secondary thin-provisioned volume 302b than is necessary. This undermines the purpose of thin-provisioning by causing the secondary thin-provisioned volume 302b to inefficiently utilize storage space.

In order to address this problem, functionality may be provided in the data replication system 300 to enable a host system 106 to determine which storage elements (e.g., tracks, groups of tracks, cylinders, groups of cylinders, extents, groups of extents, etc.) in a fully provisioned volume 302a have been allocated to data sets 324. This will enable a host system 106 to copy only those storage elements that have been allocated to data sets 324. This functionality may be implemented in the form of one or more modules in the data replication system 300. For example, in certain embodiments, the secondary host system 106b may include one or more of a read module 310, analysis module 312, copy module 314, write module 316, release module 318, and update module 320. These modules may be implemented in hardware, software, firmware, or a combination thereof. Corresponding modules (not shown) may be included in the primary host system 106a since the primary host system 106a may be configured to perform the same functions in the event of a HyperSwap® or failover event, or if the roles of the primary host system 106a and secondary host system 106b are swapped.

Prior to setting up an asynchronous mirroring relationship between a primary fully provisioned volume 302a and a secondary thin-provisioned volume 302b, the read module 310 may read, into memory of the secondary host system 106b, a copy of a volume table of contents (VTOC 322) associated with the primary fully provisioned volume 302a. The analysis module 312 may then analyze the VTOC 322 to determine which storage elements in the primary fully provisioned volume 302a have been allocated to data sets 324 and need to be copied from the primary fully provisioned volume 302a to the secondary thin-provisioned volume 302b. The analysis module 312 may accomplish this by analyzing free space descriptors in the VTOC 322 and/or descriptors of data sets 324 and their associated storage elements. Analyzing a copy of the VTOC 322 at the secondary host system 106b eliminates or reduces the need to lock the VTOC 322 at the primary site during analysis (which has the potential to reduce performance and/or interrupt production at the primary site).

To establish an asynchronous mirroring relationship between the primary fully provisioned volume 302a and the secondary thin-provisioned volume 302b, the copy module 314 initially copies data from the primary fully provisioned volume 302a to the secondary thin-provisioned volume 302b. Using the information extracted from the VTOC 322 by the analysis module 312, the copy module 314 copies only those storage elements on the primary fully provisioned volume 302a that have been allocated to data sets 324. This will reduce the number of I/Os to the primary storage system 110a and secondary storage system 110b, as well as ensure that the secondary thin-provisioned volume 302b efficiently utilizes storage space.

While the analysis module 312 is analyzing the VTOC 322 and/or storage elements are being copied from the primary fully provisioned volume 302a to the secondary thin-provisioned volume 302b, updates to storage elements may be received from the primary storage system 110a. These updates may indicate that certain storage elements have been written to or allocated to data sets 324. When such occurs, the analysis module 312 may add these storage elements to its list of storage elements to copy from the primary fully provisioned volume 302a to the secondary thin-provisioned volume 302b, and update the copy of the VTOC 322 in memory of the secondary host system 106b to reflect the updates. Once data is copied from the primary fully provisioned volume 302a to the secondary thin-provisioned volume 302b, the write module 316 may write the copy of the VTOC 322 at the secondary host system 106b to the secondary thin-provisioned volume 302b. The update module 320 may then asynchronously mirror any updates (e.g., writes to data sets 324 and/or the VTOC 322 on the primary fully provisioned volume 302a) to the secondary thin-provisioned volume 302b, as is customary with XRC and other asynchronous data replication technologies.

Figure 4:
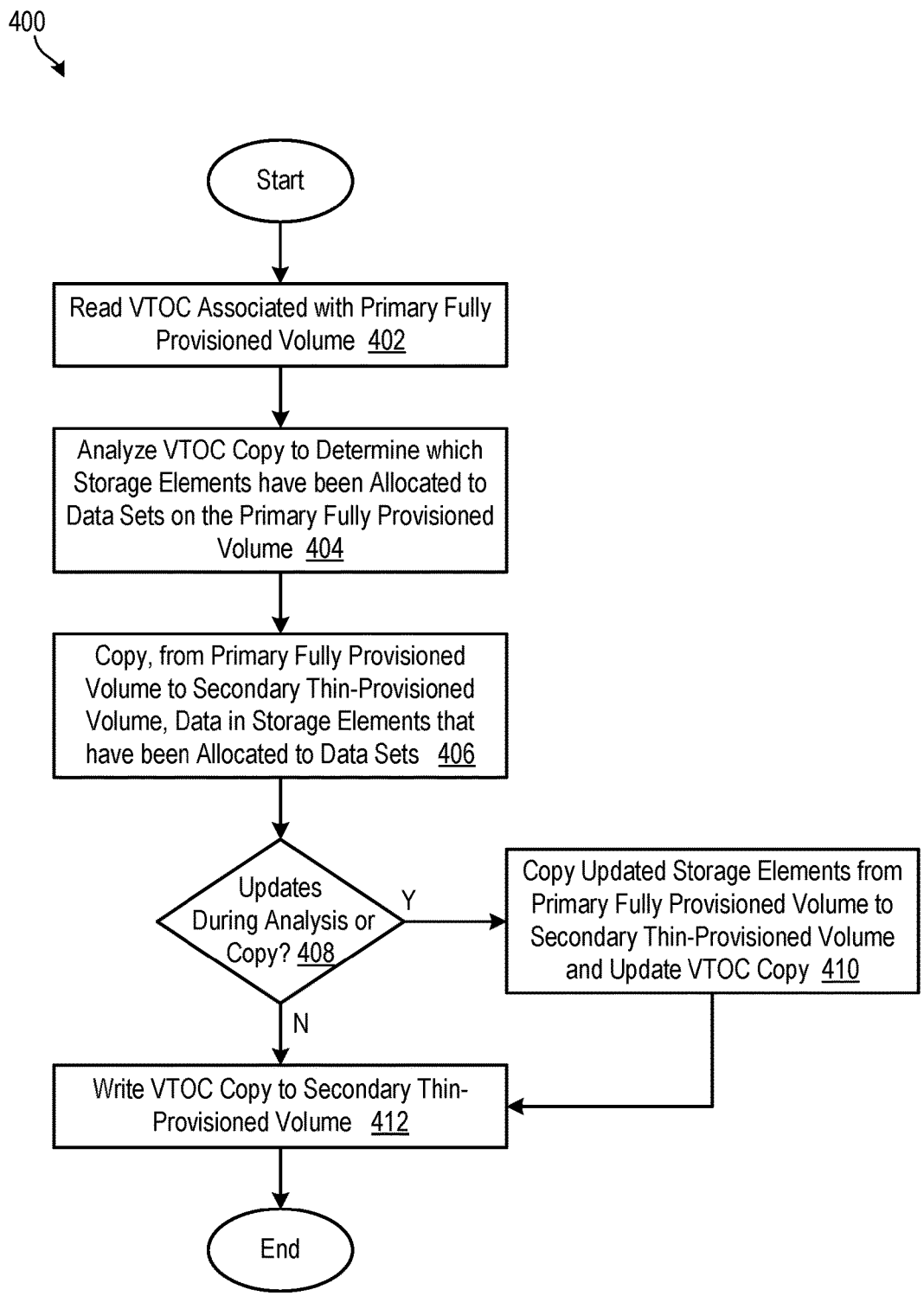
FIG. 4 is a process flow diagram showing a method for initially copying data from a primary fully provisioned volume to a secondary thin-provisioned volume.

Referring to FIG. 4, one embodiment of a method 400 for initially copying data from a primary fully provisioned volume 302a to a secondary thin-provisioned volume 302b is illustrated. As shown, the method 400 initially reads 402 a VTOC 322 associated with the primary fully provisioned volume 302a. The method 400 then analyzes 404 the VTOC 322 to determine which storage elements in the primary fully provisioned volume 302a have been allocated to data sets 324. The method 400 then copies 406, from the primary fully provisioned volume 302a to the secondary thin-provisioned volume 302b, only those storage elements that have been allocated to data sets 324.

While the VTOC 322 is being analyzed 404 and/or the storage elements are being copied 406 from the primary fully provisioned volume 302a to the secondary thin-provisioned volume 302b, the method 400 determines 408 whether any updates to storage elements were received from the primary storage system 110a. If so, the method 400 copies 410 the updates from the primary fully provisioned volume 302a to the secondary thin-provisioned volume 302b, and updates 406 the copy of the VTOC 322 in memory of the secondary host system 106b. Once all data has been copied 406, 410 from the primary fully provisioned volume 302*a* to the secondary thin-provisioned volume 302*b* and the copy of the VTOC 322 has been updated, the copy of the VTOC 322 will accurately reflect the data in the secondary thin-provisioned volume 302*b*. Accordingly, the method 400 may then write 412 the VTOC 322 from memory to the secondary thin-provisioned volume 302*b*. This will complete the initial copy of data from the primary fully provisioned volume 302*a* to the secondary thin-provisioned volume 302*b*.

Figure 5:
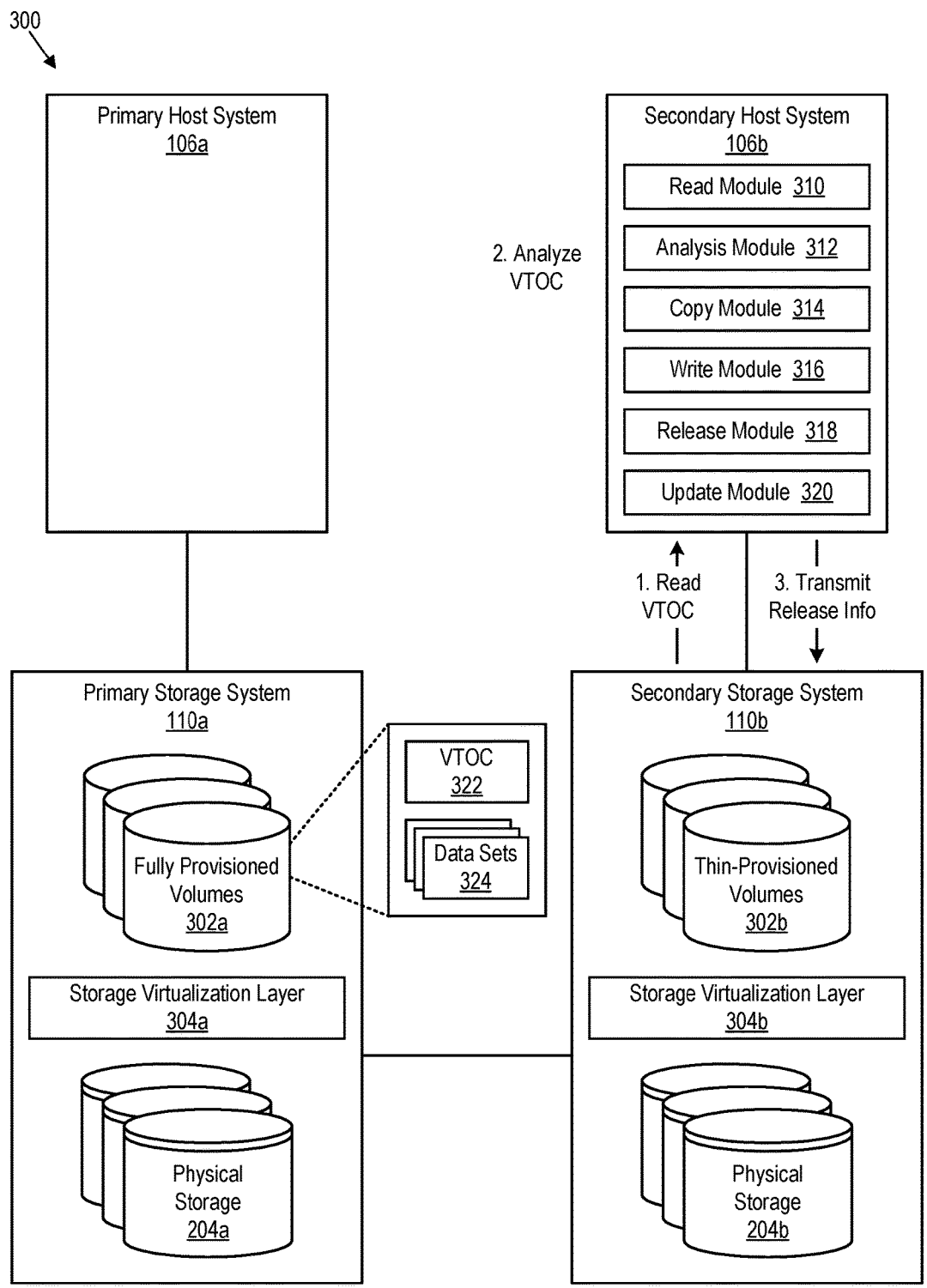
FIG. 5 is a high-level block diagram showing a data replication system and associated modules that may be configured to periodically release unused storage elements from secondary thin-provisioned volumes.

Referring to FIG. 5, in order to ensure that storage elements are released from the secondary thin-provisioned volume 302*b* to a free storage pool when they are no longer in use, the read module 310 at the secondary host system 106*b* may periodically read the VTOC 322 on the secondary thin-provisioned volume 302*b* (which will match the VTOC 322 on the primary fully provisioned volume 302*a* due to the mirroring relationship). The analysis module 312 may then analyze the VTOC 322 to determine which data sets 324 on the secondary thin-provisioned volume 302*b* have been deleted and/or which storage elements have been released from data sets 324 and returned to a pool of free storage elements. The release module 318 may then notify the storage virtualization layer 304*b* of the secondary storage system 110*b* so that it can reclaim the unused physical storage space 204*b* from the secondary thin-provisioned volume 302*b* and return it to a free storage pool, thereby making it available to other secondary thin-provisioned volumes 302*b* or the same secondary thin-provisioned volume 302*b* if needed again. In this way, a secondary thin-provisioned volume 302*b* may efficiently utilize physical storage space and prevent fully provisioning physical storage space.

Figure 6:
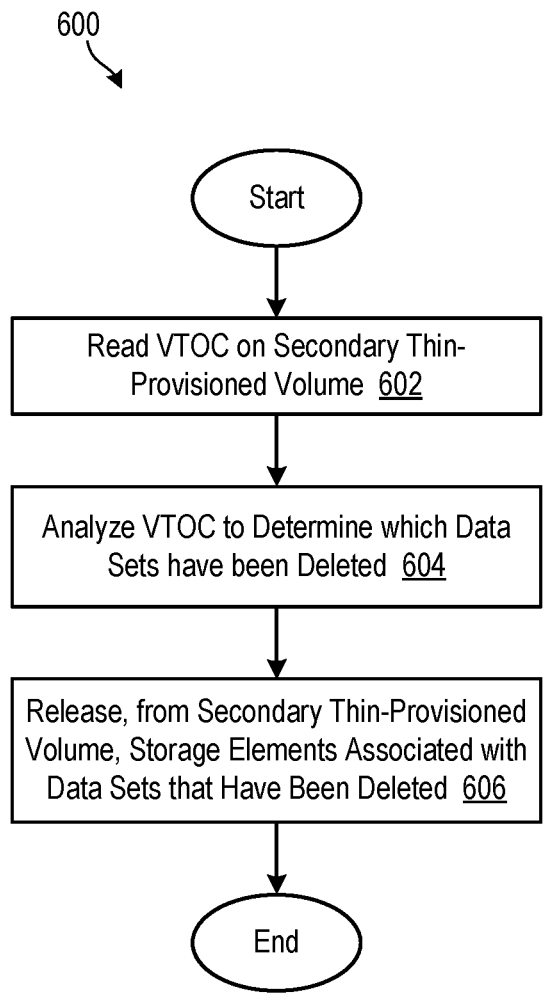
FIG. 6 is a process flow diagram showing a method for periodically releasing unused storage elements from a secondary thin-provisioned volume.

Referring to FIG. 6, one embodiment of a method 600 for periodically releasing unused storage elements from a secondary thin-provisioned volume 302*b* is illustrated. As shown, the method 600 periodically reads 602 the VTOC 322 on the secondary thin-provisioned volume 302*b* and analyzes 604 the VTOC 322 to determine which data sets 324 have been deleted and/or which storage elements have been released from data sets 324. The method 600 then releases 606, from the secondary thin-provisioned volume 302*b*, those storage elements that are associated with deleted data sets 324 or are otherwise unused. The method 600 then ends.

The modules or functions illustrated in FIGS. 3 and 5 are not limited to the locations where they are illustrated. For example, many of the modules or functions discussed in association with FIGS. 3 and 5 may be contained or included within a storage system as opposed to a host system, depending on which device is configured to perform various functions. Similarly, certain modules or functions shown at the secondary site may, in certain embodiments, be included or performed at the primary site. Thus, the locations of the modules are presented by way of example and not limitation. The systems and methods disclosed herein are not necessarily limited to use in data replication systems. Any application or system that could benefit from knowing which storage elements have been allocated to data sets 324 and/or which storage elements are unused, for the purposes of releasing storage space from a thin-provisioned volume, may beneficially use the systems and methods described herein. Such applications or systems are also deemed to fall within the scope of the invention.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for copying data from a primary fully provisioned volume to a secondary thin-provisioned volume, the method comprising:

hosting, on a primary storage system, a fully provisioned volume made up of a plurality of storage elements, wherein the storage elements include a first subset of storage elements that are allocated to the fully provisioned volume and allocated to particular data sets, and a second subset of storage elements that are allocated to the fully provisioned volume but not allocated to particular data sets;

analyzing a volume table of contents (VTOC) associated with the fully provisioned volume to determine which storage elements of the fully provisioned volume belong to the first set and which storage elements of the fully provisioned volume belong to the second set; and copying, from the fully provisioned volume to a secondary thin-provisioned volume, storage elements that belong to the first set but not storage elements that belong to the second set.

2. The method of claim 1, wherein the storage elements are one of tracks, groups of tracks, cylinders, groups of cylinders, extents, and groups of extents.

3. The method of claim 1, wherein analyzing the VTOC comprises analyzing a copy of the VTOC.

4. The method of claim 3, wherein analyzing the copy of the VTOC comprises analyzing the copy of the VTOC at a secondary host system.

5. The method of claim 4, further comprising writing the copy of the VTOC to the secondary thin-provisioned volume.

6. The method of claim 1, wherein analyzing the VTOC further comprises determining which data sets have been deleted from the fully provisioned volume.

7. The method of claim 6, further comprising releasing, from the secondary thin-provisioned volume, those storage elements associated with data sets that have been deleted.

8. A computer program product to copy data from a primary fully provisioned volume to a secondary thin-provisioned volume, the computer program product comprising a non-transitory computer-readable storage medium having computer-usable program code embodied therein, the computer-usable program code comprising:

computer-usable program code to host, on a primary storage system, a fully provisioned volume made up of a plurality of storage elements, wherein the storage elements include a first subset of storage elements that are allocated to the fully provisioned volume and allocated to particular data sets, and a second subset of storage elements that are allocated to the fully provisioned volume but not allocated to particular data sets;

computer-usable program code to analyze a volume table of contents (VTOC) associated with the fully provisioned volume to determine which storage elements of the fully provisioned volume belong to the first set and which storage elements of the fully provisioned volume belong to the second set; and computer-usable program code to copy, from the fully provisioned volume to a secondary thin-provisioned volume, storage elements that belong to the first set but not storage elements that belong to the second set.

9. The computer program product of claim 8, wherein the storage elements are one of tracks, groups of tracks, cylinders, groups of cylinders, extents, and groups of extents.

10. The computer program product of claim 8, wherein analyzing the VTOC comprises analyzing a copy of the VTOC.

11. The computer program product of claim 10, wherein analyzing the copy of the VTOC comprises analyzing the copy of the VTOC at a secondary host system.

12. The computer program product of claim 11, further comprising computer-usable program code to write the copy of the VTOC to the secondary thin-provisioned volume.

13. The computer program product of claim 8, wherein analyzing the VTOC further comprises determining which data sets have been deleted from the fully provisioned volume.

14. The computer program product of claim 13, further comprising computer-usable program code to release, from the secondary thin-provisioned volume, those storage elements associated with data sets that have been deleted.

15. A system to copy data from a primary fully provisioned volume to a secondary thin-provisioned volume, the system comprising:
    at least one processor;
    at least one memory device operably coupled to the at least one processor and storing instructions for execution on the at least one processor, the instructions causing the at least one processor to:
    host, on a primary storage system, a fully provisioned volume made up of a plurality of storage elements, wherein the storage elements include a first subset of storage elements that are allocated to the fully provisioned volume and allocated to particular data sets, and a second subset of storage elements that are allocated to the fully provisioned volume but not allocated to particular data sets;
    analyze a volume table of contents (VTOC) associated with the fully provisioned volume to determine which storage elements of the fully provisioned volume belong to the first set and which storage elements of the fully provisioned volume belong to the second set; and
    copy, from the fully provisioned volume to a secondary thin-provisioned volume, storage elements that belong to the first set but not storage elements that belong to the second set.

16. The system of claim 15, wherein the storage elements are one of tracks, groups of tracks, cylinders, groups of cylinders, extents, and groups of extents.

17. The system of claim 15, wherein analyzing the VTOC comprises analyzing a copy of the VTOC.

18. The system of claim 17, wherein analyzing the copy of the VTOC comprises analyzing the copy of the VTOC at a secondary host system.

19. The system of claim 18, wherein the instructions further cause the at least one processor to write the copy of the VTOC to the secondary thin-provisioned volume.

20. The system of claim 15, wherein the instructions further cause the at least one processor to determine, from the VTOC, which data sets have been deleted from the fully provisioned volume and release, from the secondary thin-provisioned volume, those storage elements associated with data sets that have been deleted.

* * * * *